Aug. 25, 1925.

R. H. KERLIN 1,550,818

WINDSHIELD FOR MOTOR VEHICLES

Filed Dec. 20, 1924

INVENTOR
R. H. KERLIN
BY
ATTORNEYS

Patented Aug. 25, 1925.

1,550,818

UNITED STATES PATENT OFFICE.

ROBERT H. KERLIN, OF CHICAGO, ILLINOIS.

WINDSHIELD FOR MOTOR VEHICLES.

Application filed December 20, 1924. Serial No. 757,247.

*To all whom it may concern:*

Be it known that I, ROBERT H. KERLIN, a citizen of the United States, and a resident of Chicago, in the county of Cook and State of Illinois, have invented a new and useful Improvement in Windshields for Motor Vehicles, of which the following is a full, clear, and exact description.

My invention relates to improvements in windshields, for motor vehicles, and it consists in the combinations, constructions, and arrangements herein described and claimed.

An object of my invention is to provide a windshield of the character described in which means is provided for permitting the passage of air in predetermined quantities to the tonneau of the vehicle, yet which effectively prevents the entrance of rain, snow or sleet.

A further object of my invention is to provide a windshield of the character described which employs a single sheet of glass, thereby lending unobstructed vision for the driver, yet permitting proper and adequate ventilation.

A further object of my invention is to provide a windshield of the character described in which novel means is employed for opening and closing the windshield, which eliminates the necessity of employing lock nuts or the like, which must be actuated each time the windshield is adjusted for ventilation.

A further object of my invention is to provide a windshield in which auxiliary ventilating openings adjacent the top of the windshield are provided with means for adjustment, whereby a circulation of air over the windshield glass may be created to prevent the frosting of the glass in extremely cold weather.

A further object of my invention is to provide a windshield of the character described that is simple in construction, extremely durable and thoroughly practical commercially.

Other objects and advantages will appear in the following specification, and the novel features of the invention will be particularly pointed out in the appended claims.

Figure 1:
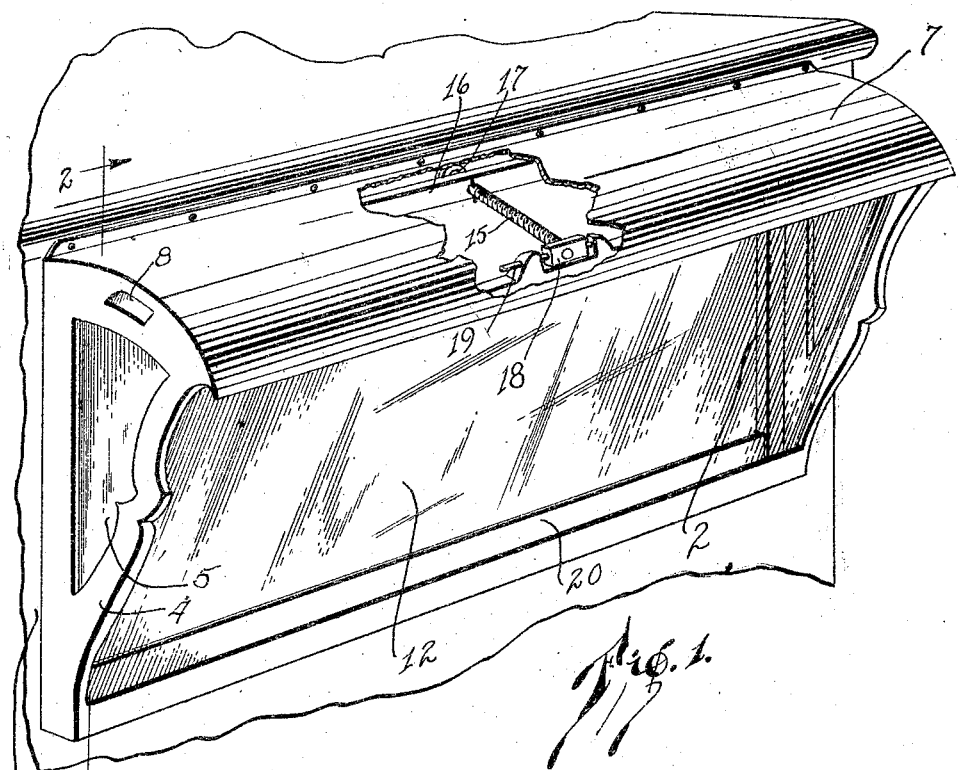
Figure 2:
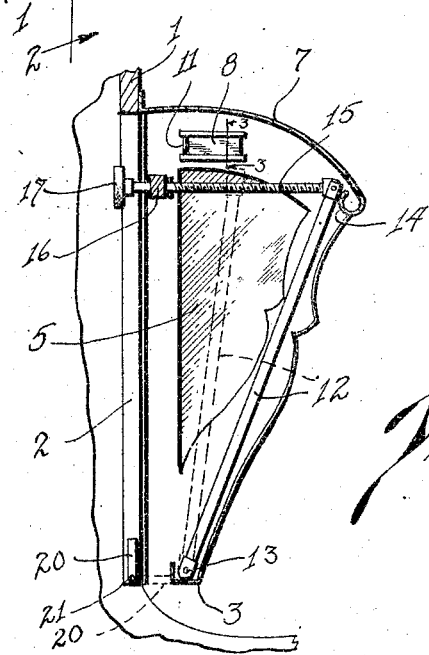
Figure 3:
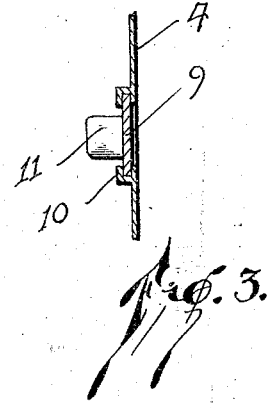

My invention is illustrated in the accompanying drawings forming part of this application, in which Figure 1 is a perspective view of an embodiment of my invention, Figure 2 is a sectional view along the line 2—2 of Figure 1, and Figure 3 is a sectional view along the line 3—3 of Figure 2.

In carrying out my invention I make use of the ordinary type of motor vehicle having a windshield retaining frame 1. When employing my improved windshield, the entire upper and lower sash frame of the standard type of windshield is removed, as well as the metal frame fixed to the retaining frame 1. If the windshield is applied at the factory at the time the vehicle is constructed, the frame 1 is especially adapted to the application of the present type of windshield.

My improved windshield consists in a metal frame 2 which engages with the frame 1 on the sides and top, and which extends a short distance in front of the frame 1 at the bottom, as shown at 3 (see Figure 2).

The frame 2 has forwardly projecting triangular side wall portions 4 and glass inserts 5 so that the driver may have as nearly unobstructed vision as possible through the sides of the windshield. This is necessary since my improved windshield projects somewhat in front of the windshield retaining frame 1 at the top.

A metal visor 7 is disposed at the upper end of the frame 2 and extends forwardly of the foremost corners of the triangular side members 4. This visor 7 is curved downwardly as shown in Figure 2.

A pair of ventilating apertures 8 are provided through the side walls of the frames 4 adjacent to the visor 7. Plates 9 are slidably disposed in slideways 10 for controlling the admission of air through the apertures 8. These slide members 9 are on the inner side of the frame members 4 so they may be actuated as by means of a hand grip 11 from within the vehicle.

A single windshield sash 12 is pivotally mounted at 13 upon the frame 2 adjacent to the portion 3. This sash 12 is adapted to contact with an inwardly curved roll portion 14 of the visor 7 when in the position shown in full lines of Figure 2, thus sealing the point of contact between the visor 7 and the sash 12.

Means for moving the sash 12 toward and away from the frame member 2, whereby the quantity of air admitted between the portions 4 of the visor and the top of the sash, may be predetermined, is provided in a worm screw 15 which is projected through a horizontally extending rod 16 carried by the frame member 2. The worm screw 15 is rotatably mounted with respect to the rod 12 and has a hand grip 17 at the innermost end by means of which the worm screw may be rotated.

A threaded lug 18 is pivotally supported upon the upper portion of the sash 12 as shown at 19, and the worm screw 15 is operatively engaged therewith. Thus rotation of the worm screw 15 will occasion movement of the sash 12 toward or away from the frame member 2 at will.

With reference now to Figure 2 it will be noted that there is a space between the lower end or pivotal support 13 of the sash 12 and the frame member 2 through which air may pass into the tonneau of the vehicle. In order to permit the control of air passing through this portion of the windshield, I have provided a hingedly mounted rigid deflector and shutter plate 20 having its pivotal support 21 carried by the frame member 2. Thus the plate 20 may be moved to the position shown in dotted lines to close the space between the sash, and the frame 2, or it may be moved to the position shown in full lines to admit the deflected air through the forementioned space.

It will be noted that the peculiar curvature of the visor 7 (see Figure 2) provides an increasing distance between the top of the sash 12 and the inner wall of the visor as the sash is moved toward the frame 2 so that when the sash is moved parallel with the frame member 2 relatively large quantities of air may be admitted to the interior of the vehicle and the visor 7 will overlap the top of the sash sufficiently to preclude the admission of rain, sleet, snow or the like.

From the foregoing description of the various parts of the device the operation thereof may be readily understood. During extremely cold weather, persons driving enclosed cars are inconvenienced by the presence of frost on the windshield which obstructs vision and makes driving hazardous. Such an occurrence may be easily prevented by the use of my improved windshield by merely turning the handgrip 17 so as to move the handgrip slightly away from the portion 14 of the visor. The ventilating openings 8 should then be opened slightly and thus circulation of air adjacent to the windshield will be created which will absorb moisture from the windshield and thus prevent accumulation of frost. It may be desirable to adjust the windshield with the sash 12 closed against the portion 14 and instead the deflector plate 20 opened slightly.

In moderate weather, the sash 12 may be moved to any position at will, by actuation of the worm screw 15 and likewise actuation of the cooperating ventilating members 9 and 20 so as to properly balance the circulation of fresh air to suit the particular requirements of the person or persons occupying the vehicle. In the event of storm, it is not necessary to close the sash, since the ventilating aperture is sufficiently close to the inner wall of the visor 7 as to effectively preclude the entrance of rain, snow or sleet therethrough.

I claim:

1. A windshield of the character described comprising a frame, a windshield sash pivotally mounted at its lowermost end in said frame, a visor forming the upper end of said frame, said visor arranged to overhang the upper end of said sash, means for manually adjusting the position of said sash on its pivotal support, and means for permitting and excluding at will the passage of air between the lower end of said frame and the adjacent parts of the motor vehicle upon which the windshield is mounted, said visor being curved in cross section and having its innermost edge at a greater distance from the pivotal support of said sash than its foremost edge, whereby the space between the top of said sash and said visor is increased as said sash is moved rearwardly relative to said visor.

2. A windshield of the character described comprising a frame having substantially triangular side members, a visor forming the upper end of the frame, a windshield sash pivotally mounted at its lowermost end in said frame, said visor being arranged to overhang the upper end of the sash, and means for manually adjusting the position of said sash on its pivotal support, said visor being curved in cross section and having its innermost edge at a greater distance from the pivotal support of said sash than its foremost edge, whereby the space between the top of said sash and said visor is increased as said sash is moved rearwardly relative to the visor.

3. A windshield of the character described comprising a frame having substantially triangular side members, a visor forming the upper end of the frame, a windshield sash pivotally mounted at its lowermost end in said frame, said visor being arranged to overhang the upper end of the sash, and means for manually adjusting the position of said sash on its pivotal support, said visor being curved in cross section and having its innermost edge at a greater distance from the pivotal support of said sash than its foremost edge, whereby the space between the top of said sash and said visor is increased as said sash is moved rearwardly relative to the visor, said means comprising a threaded shaft mounted for rotation on said frame, a threaded lug carried by said sash and in engagement with the threaded shaft whereby rotation of the shaft will cause movement of the sash.

ROBERT H. KERLIN.